Fig. 1

INVENTOR
ROBERT A. ERICKSON
BY [signature]
ATTORNEY

June 29, 1965 R. A. ERICKSON 3,191,441
WELD QUALITY MONITORING DEVICE FOR WELDING MACHINES
Filed Sept. 4, 1962 7 Sheets-Sheet 2

United States Patent Office 3,191,441
Patented June 29, 1965

3,191,441
WELD QUALITY MONITORING DEVICE FOR WELDING MACHINES
Robert A. Erickson, St. Paul, Minn., assignor to Sperry Rand Corporation, New York, N.Y., a corporation of Delaware
Filed Sept. 4, 1962, Ser. No. 221,275
12 Claims. (Cl. 73—432)

This invention relates in general to welding apparatus and in particular to an apparatus which utilizes the time-temperature integral of the weld heat-pulse as a criterion of the weld quality.

Conventional applications of quality control techniques to the mass production of welds rely on the statistical assumption that if a specified sample of a production lot is destructively tested and found acceptable, all welds of the production lot are acceptable. However, unless the sample is of a substantial number and proportion to the total production lot, the inaccuracy of the statistical assumption may be prohibitive. This may be especially so as regards electronics, micro-modular packaging which requires a highly reliable product. The applicant has discovered a novel quality control method whereby a highly reliable production lot weld can be determined during the welding process of each weld, thus eliminating the need for production lot sample destructive testing. This method utilizes the time-temperature integral of the weld heat-pulse and compares this time-temperature integral to a previously established acceptable range of values, or a minimum value.

Accordingly, it is a primary objective of this invention to provide a method which, by monitoring a weld heat-pulse, utilizes the time-temperature integral of a weld as a criterion of the acceptable quality of the weld.

Another object of this invention is to provide a method of the quality control of a welding process which method monitors the welding process of each weld of the production resistance weld lot and provides an instantaneous indication of the weld quality.

Another object of this invention is to provide a method of the quality control of a welding process which, by monitoring the welding process of each weld, provides an instantaneous indication of the weld quality that eliminates the need for destructive testing of a statistical sample to determine weld quality.

Another object of this invention is to provide a method and an apparatus which establishes a correlation between the quality of a weld and the energy dissipated in the weld.

A further object of this invention is to provide a method and an apparatus which utilizes an infrared detector to detect the energy dissipated in a weld and which provides a GO-NO GO determination of the weld quality as a function of the energy dissipated.

A still further object of this invention is to provide a method and an apparatus which provides an instantaneous determination of the quality of a weld by monitoring the time-temperature integral of the energy dissipated in the weld.

These and other more detailed and specific objectives will be disposed in the course of the following specification, reference being had to the accompanying drawings in which.

A preferred embodiment of the invention disclosed herein provides a method and an apparatus which includes an infrared detector to monitor a resistance weld heat-pulse which is emitted by a workpiece during the welding process. The apparatus produces an output voltage whose level corresponds to the time-temperature integral value of the weld heat-pulse. This voltage level when electronically compared to a predetermined acceptance level provides the quality control acceptance level of the monitored weld. The applicant has discovered that the time-temperature integral of the weld heat-pulse has a high correlation with the quality of the weld accommodating all of the uncontrollable resistance welding process variables, thus producing a highly reliable determination of the weld quality and eliminating the need of expensive and time-consuming destructive testing of production lot samples. In one embodiment of applicant's invention there is provided a production lot GO-NO GO tester which permits a continuous monitoring of the welding process wherein a voltage indicative of an acceptable weld is set into a comparator which electronically compares the monitored voltage to the acceptable voltage, producing a NO GO indication when an unsatisfactory comparison is made.

Resistance welding is a general term for a group of methods for joining metals together electrically wherein a low voltage forces a short-duration, high density current through an area covered by the welding electrodes. A mechanical force, measured in pounds, is applied to the electrodes before, during and after the current flows in order to produce the proper conditions for heating and forging the metals together. Total heat H generated in the work piece and the electrodes is expressed in watt-seconds as:

$$H = I^2 R T$$

where, $H$ = Total heat in watt-seconds
$I$ = Current in amperes
$R$ = Total contact and work piece resistance measured between the electrodes in ohms
$T$ = Time of current flow in seconds Most welding equipment has low-inertia electrode systems so that welding electrodes maintain the proper forces on the weld at all times. If the electrodes fail to follow through, the increased contact resistance may cause excessive heating, resulting in burning of the electrodes and explosions of the overheated weld metal. Electrode pressure and clamping speed should be such as to provide proper electrical and physical contact of the electrodes and the work piece but yet not deform the work piece. As the electrodes serve five essential functions in the welding process, their design and pressure are dictated by each particular work piece design: (1) They apply the necessary force to bring the parts of the work piece into intimate contact at the interfaces and into proper alignment; (2) They produce the proper contact resistances between the electrodes and the work pieces which include the interfaces; (3) They conduct the welding current; (4) They prevent spitting, porosity and internal ingot cracking by maintaining a proper force on the weld; and (5) They dissipate the heat developed in the work piece after the weld is made. Consequently, the weld schedule, which consists of the welding equipment energy setting in watt-seconds and the electrode-clamping pressure in pounds, and the electrode design are determined empirically for each welding requirement by conventional methods and are presumed to be known prior to use of the method and apparatus disclosed herein.

Assuming the weld schedule to have been established by well known methods, the determination of an acceptable time-temperature integral value may consist of the following typical procedures:

(1) Determine a range of welding equipment electrode clamping pressure and weld energy settings above and below that of the established weld schedule, (2) Conduct a sample run of welds at the settings of (1) monitoring the time-temperature integral of each weld, (3) Destructively test all of the welds of (2), determining the quality of the welds as a function of weld pull-strength in pounds, (4) Plot a graph of the results of (3) as weld pull-strength in pounds vs. weld time-temperature integral in volts, (5) Determine by established methods the minimum acceptable weld pull-strength, (6) Plot the result of (5) as a straight line limit on the graph of (4), (7) Determine from the graph of (6) the minimum time-temperature integral and the corresponding voltage level that would provide the desired confidence level of weld quality, and (8) Insert the corresponding voltage level of (7) into a GO-NO GO tester comparator to provide a NO GO indication when an unacceptable weld heat-pulse is monitored by the infrared detector.

Before discussing in detail the preferred embodiment of applicant's invention, a brief discussion of the theory of operation of applicant's invention shall be had. Although the particular embodiment disclosed herein has been utilized to perform a quality control function in the welding step of a micro-modular packaging process of electronic equipment, it is not to be construed that the scope of applicant's invention is to be limited thereto. It is to be appreciated that applicant's concept of the infrared monitoring of a resistance weld heat-pulse to produce a satisfactory weld heat-pulse (time-temperature integral) correlation may be utilized in many applications.

Applicant's method of resistance weld quality control operates on the premise that a weld between known materials will be of acceptable quality if a specific time-temperature integral is achieved during the pulsed weld and that the acceptability of the weld will not necessarily be a direct function of the weld schedule. Detection of this time-temperature integral is accomplished remotely by utilizing the energy radiated away from the weld during the welding process. A detector sensitive to radiation in the infrared through the visible range is used to detect the radiation and through appropriate electronic circuitry to yield an output voltage level which is representative of the weld time-temperature integral. By performing a plurality of welds at various weld schedules and monitoring the weld time-temperature integral, a plot of weld pull-strength in pounds vs. time-temperature integral in volts may be made after destructive tests of the welds to determine the necessary test data. Selection of the optimum weld pull-strength in pounds by established methods is then made and this value is then entered on this plot as a design limit for the determination of the minimum acceptable time-temperature integral directly readable therefrom. This acceptable time-temperature integral expressed in volts is then set into a GO-NO GO tester which electronically compares the monitored time-temperature integral voltage to the established acceptable voltage level and provides an indication if an unacceptable comparison is made.

Figure 1:
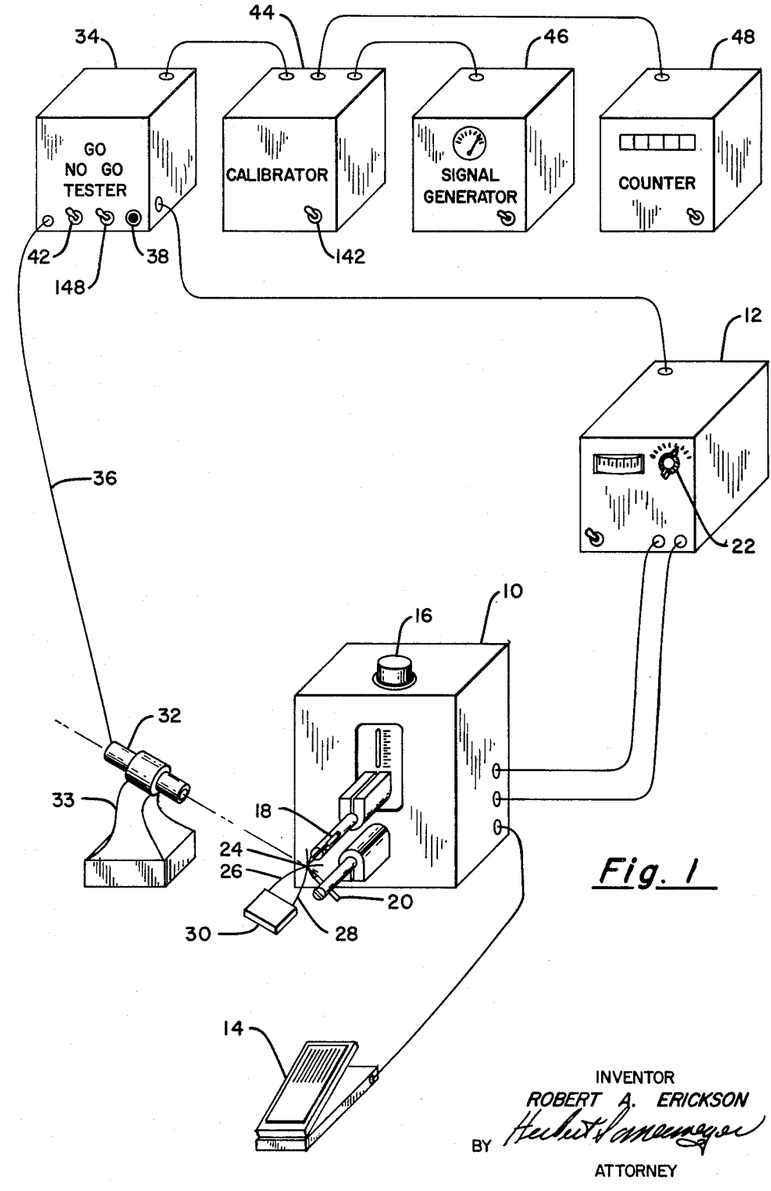
FIG. 1 is a diagrammatic illustration of the apparatus utilized in the preferred embodiment of this invention.

Reference to FIG. 1 discloses a weld head 10 and its associated power supply 12 and foot pedal actuator 14. Weld head 10 has variable, settable, electrode clamping pressure means 16 whereby a range of electrode clamping pressures may be applied to electrodes 18 and 20 upon initiation of actuator 14. Power supply 12 has an energy setting means 22 whereby a range of weld input energy values may be applied to work piece 24. Work piece 24 in one application consists of electrical leads dumet lead 26 and nickel ribbon lead 28 of micro-module 30. Infrared detector 32 is securely held by holding means 33 and is oriented so as to be focused upon work piece 24 when work piece 24 is formed during the welding process. The output of detector 32 is coupled to GO-NO GO tester 34 by cable 36.

When the welding cycle is initiated by actuator 14, electrode 18 is moved downwardly, clamping leads 26 and 28 between it and electrode 20. When the set clamping pressure is achieved, the weld current pulse from power supply 12 is coupled across electrodes 18 and 20 forming the weld. During the welding process, work piece 24 and electrodes 18 and 20 emit a heat-pulse of radiant energy which is detected by detector 32 which produces a related output voltage. This output voltage is coupled to GO-NO GO tester 34 which integrates the signal amplitude vs. time and produces a second voltage whose level is a function of the time-temperature integral of the radiated heat-pulse. This second voltage is then electronically compared to a previously determined acceptable voltage level indicative of an acceptable weld and produces an output signal if an unsatisfactory comparison is made. Upon the determination of an unsatisfactory comparison light 38 on tester 34 lights up and a disable signal disables power supply 12 until reset by means of reset switch 42.

As tester 34 performs only the GO-NO GO testing of the weld process, additional equipment is required to permit evaluation of the voltage level which is indicative of an acceptable weld and which voltage is set into the comparator of tester 34 to perform its test function. To permit a practical packaging of the circuitry necessary to implement applicant's novel method of the evaluation of a production lot resistance weld, the required hardware has been packaged in two separate units; GO-NO GO tester 34, and calibrator 44. Calibrator 44, when combined with signal generator 46 and counter 48 provides an output via counter 48 which is related to the time-temperature integral in volts of the particular weld monitored. The monitor cycle for this operation is initiated by actuator 14 as with the GO-NO GO test procedure. However, a timing pulse of the calibrator 44 clock source starts a ramp voltage generator and enables a gate between signal generator 46 and counter 48. When the ramp voltage reaches the level of the tester 34 integrator at the tester 34 comparator input, the comparator is switched and disables counter 48. With the ramp voltage adjusted at a rise of 10 volts per second and with counter 48 output set at a frequency of 1 kilocycle per second (kc.), counter 48 output is read as tens of millivolts, with the count displayed by counter 48 being a relative reading of the value of the time-temperature integral of the weld-pulse detected by tester 34.

An additional feature is provided in the preferred embodiment of FIG. 1. This feature is the provision of circuitry in calibrator 44 which provides calibration pulses to tester 34 in place of the output of detector 32 to permit calibration of GO-NO GO tester 34 operation.

To facilitate the subsequent discussion of FIG. 1, three modes of operation shall be set out:

Mode 1 shall refer to operation of tester 34 as a GO-NO GO monitor of a welding production lot run.

Mode 2 shall refer to operation of tester 34 in its calibration procedure.

Mode 3 shall refer to operation of tester 34 in its operation as a device to provide an output via counter 48 which output is representative of the time-temperature integral of the monitored weld heat-pulse.

Figure 2:
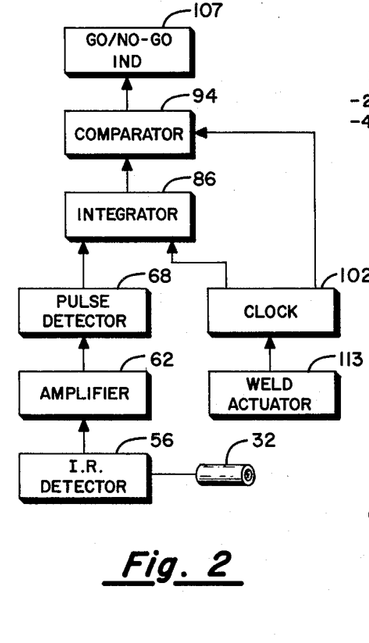
FIG. 2 is a block diagram of the GO-NO GO test apparatus of FIG. 1.

The operation of Mode 3 provides the data to be plotted on a graph of time-temperature integral in volts vs. weld pull-strength and optimum weld pull-strength so as to determine the voltage level that is to be set in tester 34 as the criterion against which the tester 34 comparator is to determine the monitored weld quality.

Figure 3A:
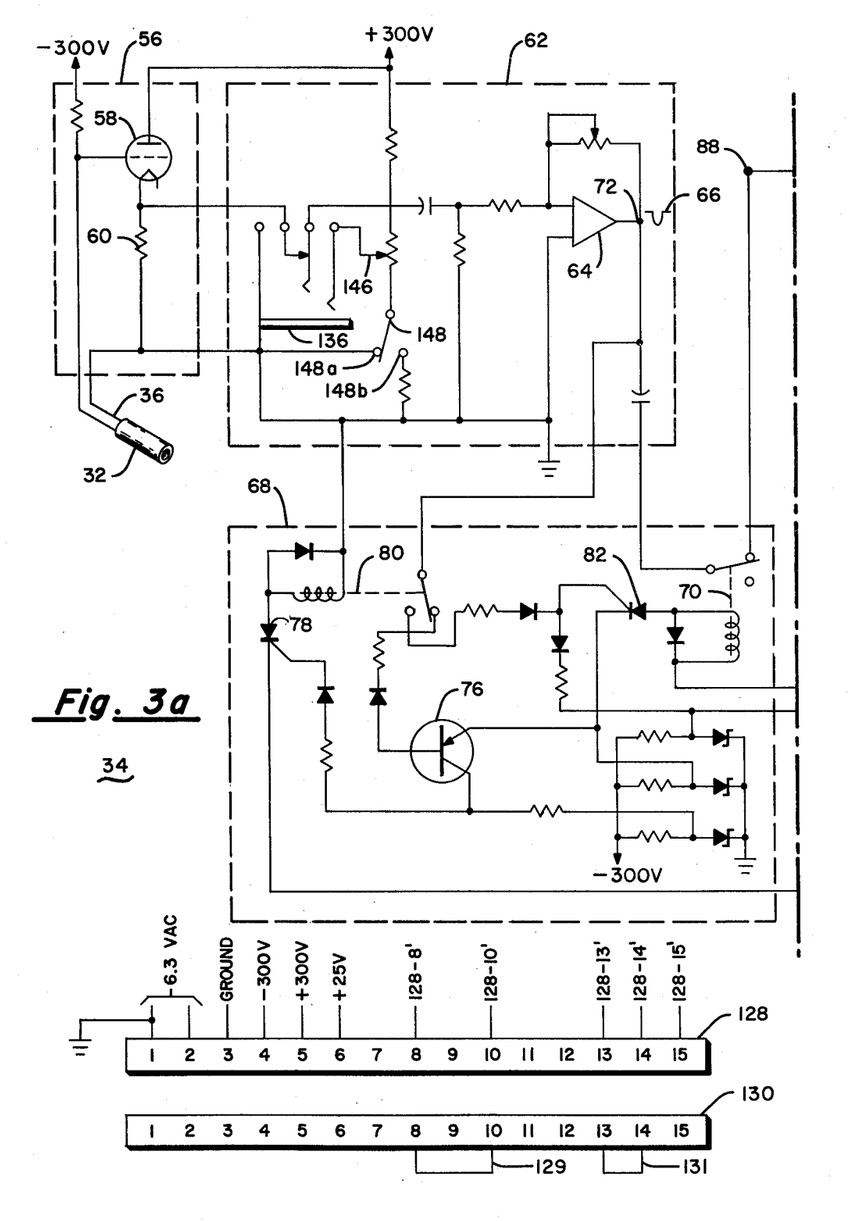
FIG. 3, consisting of portions a and b, is a schematic diagram of the circuitry of FIG. 2.
Figure 3B:
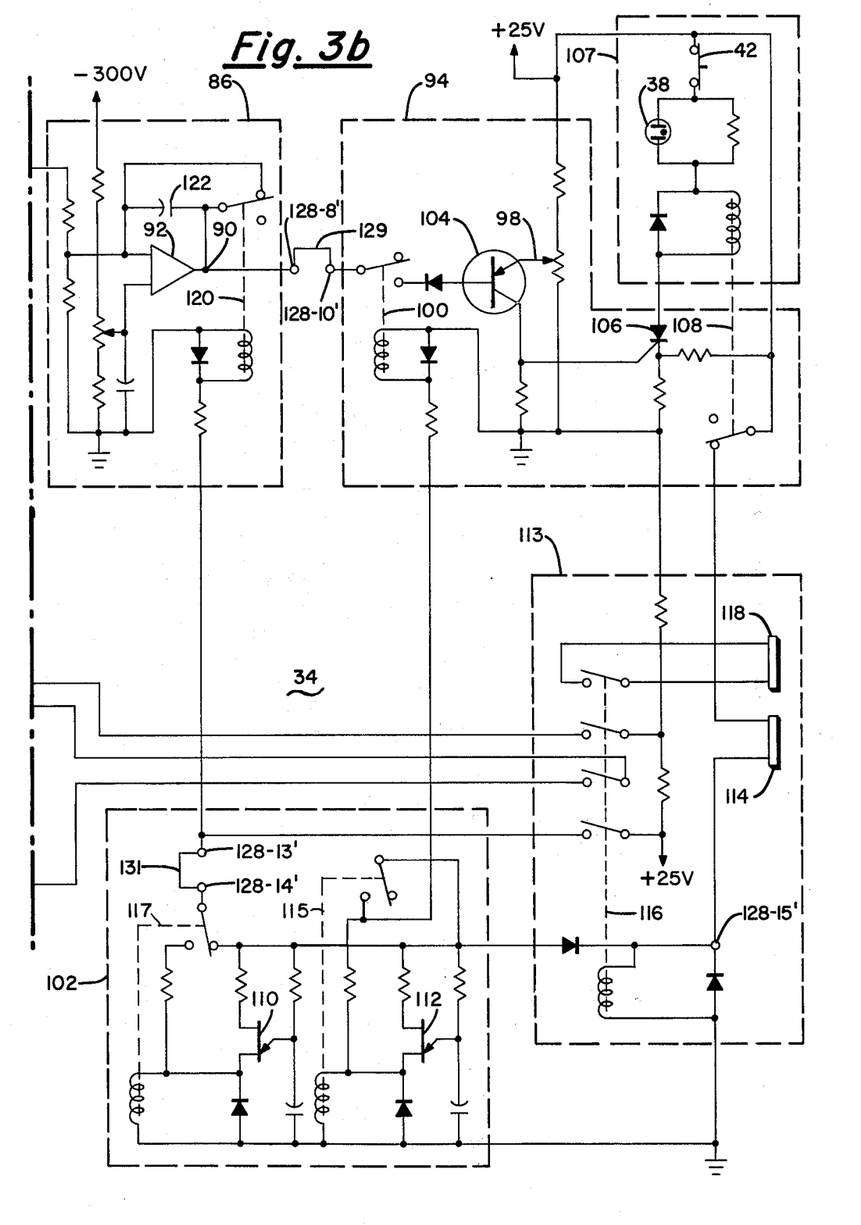
Figure 4:
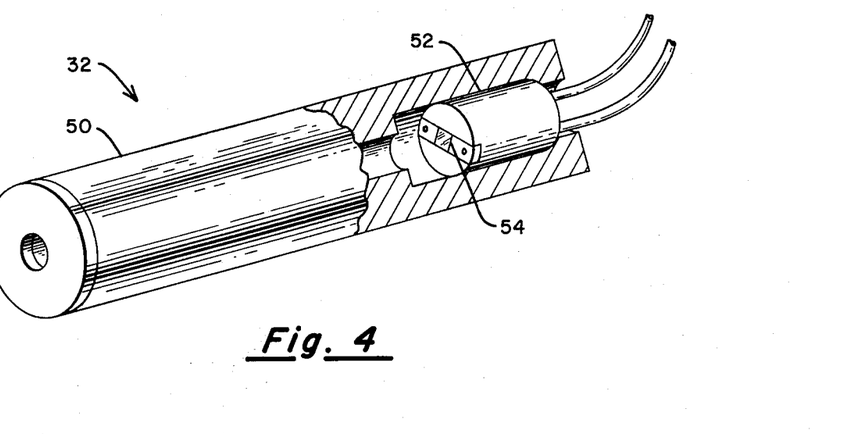
FIG. 4 is a drawing of the detector utilized in a preferred embodiment of FIG. 1.
Figure 5:
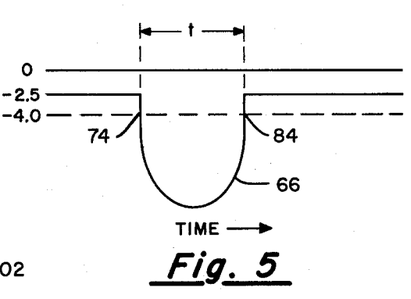
FIG. 5 is an illustration of the amplified detector output signal.
Figure 6:
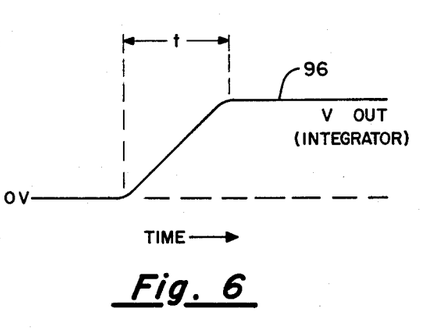
FIG. 6 is an illustration of the amplified integrator output signal.

FIG. 2 is a block diagram of tester 34 with FIG. 3 illustrating the detailed circuitry associated therewith. Detector 32 as illustrated in FIG. 4 consists of a collimator having an aluminum body 50 and a phenolic base 52 upon which an infrared sensitive generator 54 is mounted. In the preferred embodiment of FIG. 1, generator 54 consists of a lead sulfide film deposited upon a quartz base whose sensitive area measures 1.0 millimeter (mm.) by 1.0 mm. and whose dark resistance is 0.6 megohms with a maximum bias of 10.0 volts. Any suitable commercial equivalent such as Eastman Kodak Ektron detector type N-2 is available and may be utilized in this embodiment. Generator 54 is coupled to a voltage source providing a bias across generator 54 of approximately 7.5 volts. With the center line of detector 32 colinear with an unblocked portion of work piece 24, a heat-pulse due to the passage of the welding current through electrodes 18 and 20 and work piece 24 generates and emits radiant energy which, when detected by detector 32, causes a decrease in the resistance of generator 54. Generator 54 then produces a positive output voltage pulse which is coupled to infrared detector 56. The positive pulse output of the cathode follower arranged vacuum tube 58 and resistor 60 is coupled to amplifier 62, driving operational amplifier 64 having a gain of approximately 16. The output of amplifier 64 is a negative pulse 66 which is detected by pulse detector 68. Pulse detector 68 performs the function of opening switch 70 after the passage through node 72 of output pulse 66. Reference to FIG. 5 illustrates this action at node 72 of amplifier 62. As pulse 66 crosses point 74 on its leading edge, transistor 76 conducts and causes silicon controlled rectifier 78 to conduct, which action operates switch 80 thereby applying the pulse to the control electrode of silicon controlled rectifier 82. As the trailing edge of pulse 66 crosses point 84, silicon controlled rectifier 82 conducts actuating switch 70, opening the input to integrator 86 at node 88, which holds the integrated pulse at node 90 at a constant level 96 after amplification by operational amplifier 92 and as illustrated in FIG. 6. The voltage level 96 at node 90 is thus an indication of the time-temperature integral of the heat-pulse of time duration $t$ as detected by detector 32.

To perform the GO-NO GO testing function, comparator 94 performs a voltage comparison of the integrated pulse voltage level 96 to a specified voltage level as determined by the setting of potentiometer 98 of comparator 94 of FIG. 3. The output of integrator 86, or voltage level 96, is pulsed into comparator 94 through switch 100 after a delay of 300 milliseconds (ms.) as determined by the action of clock 102. If voltage level 96 is less than a specified voltage determined by the setting of potentiometer 98, transistor 104 will conduct and couple a firing voltage to the control electrode of silicon controlled rectifier 106. When silicon controlled rectifier 106 conducts, indicator lamp 38 of indicator 107 lights and switch 108 disables pressure switch 114. The cycle of the GO-NO GO tester 34 function is determined by clock 102 delay circuits of unijunction transistors 110 and 112 and is initiated by pressure switch 114 of weld actuator 113 in weld head 10. Switch 114 actuates switch 116 which actuates weld solenoid 118 and provides control voltages to the delay stages of transistors 110 and 112 which are time delays of 500 ms. and 300 ms., respectively, as determined by the RC networks of their respective emitter circuits. At a time 300 ms. after start of the clock cycle by closing of switch 116 transistor 112 conducts energizing its associated switch 115 which provides a holding voltage for itself and an energizing voltage for switch 100. The energizing of switch 100 pulses the output of the integrator 86 at node 90 into the circuitry of comparator 94. At a time 500 ms. after the start of the clock cycle transistor 110 conducts and provides an energizing voltage for its associated switch 117 which terminates the clock cycle by removing the energizing voltage from switch 116 and from the delay stages of transistors 110 and 112. Switch 120 of integrator 86 is actuated at the start of the cycle to remove a short circuit across the integrating capacitor 122 and with the circuit component values selected results in a cycle time of approximately 100 milliseconds. If a NO GO condition is determined by comparator 94 the circuit must be reset by opening reset switch 42 in the anode circuit of silicon controlled rectifier 106.

Figure 7A:
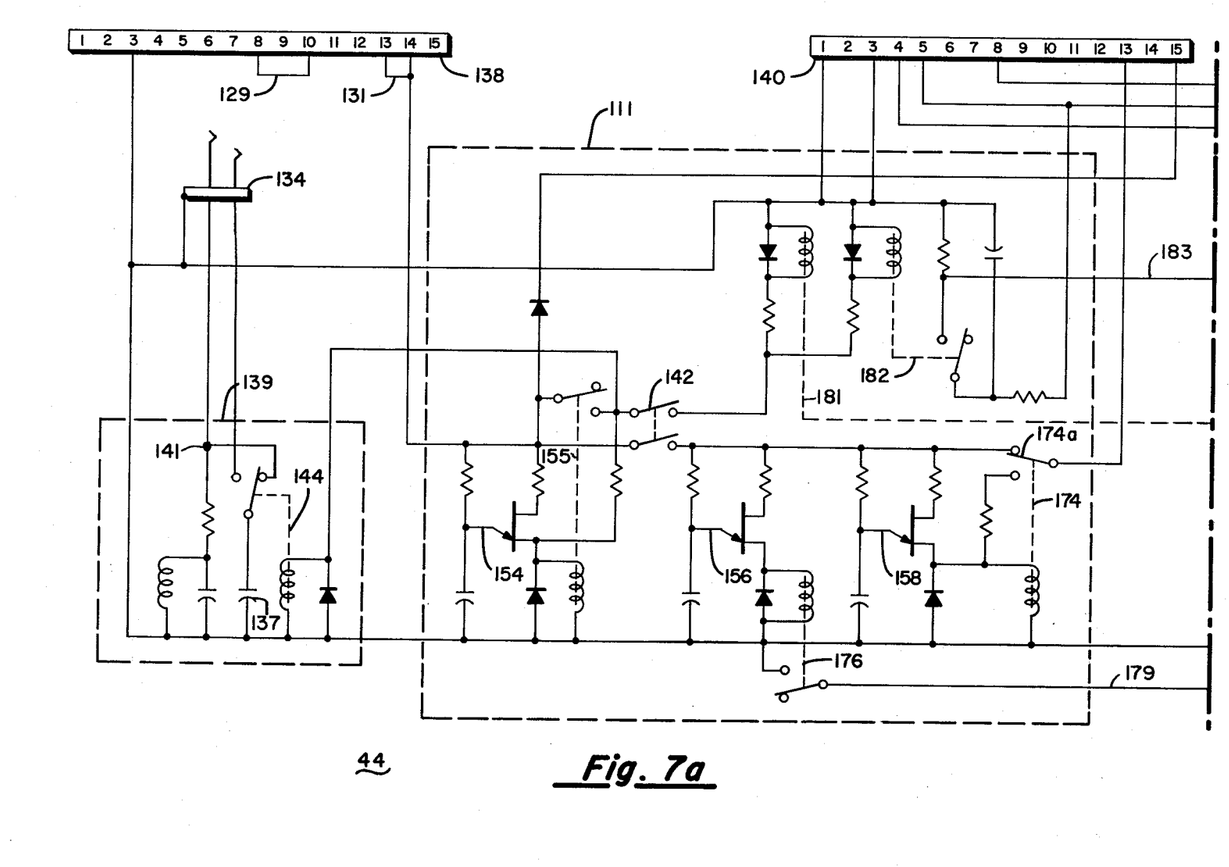
FIG. 7, consisting of portions a and b, is a schematic diagram of the additional circuitry necessary to calibrate and establish test data for GO-NO GO test operation.
Figure 7B:
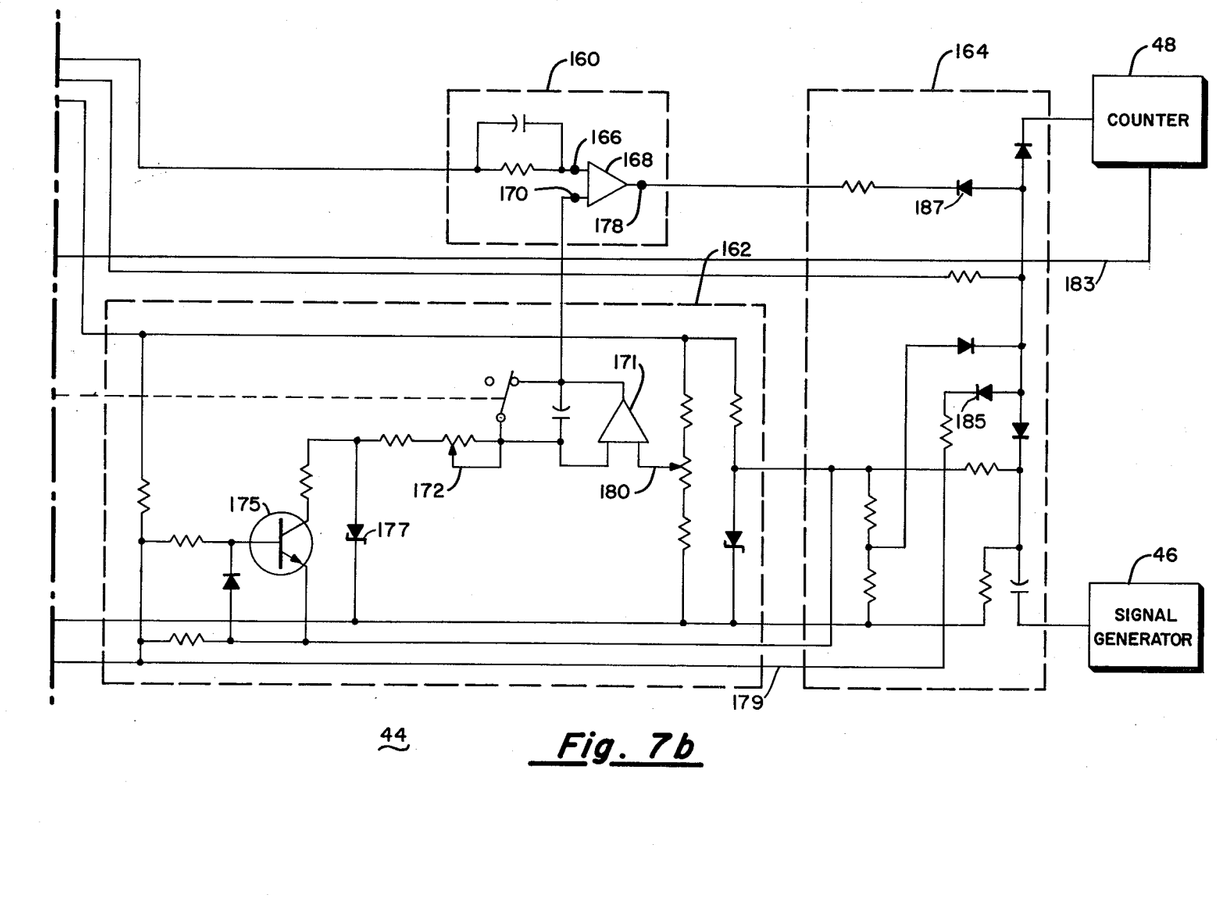

Reference to FIG. 3 discloses receptacle 128 having pins 128–1 through 128–15, providing means to couple the GO-NO GO tester 34 circuitry of FIG. 3 to the control signals of FIG. 7. Pin 128–8 is coupled to a point 128–8' on the output end of integrator 86 while pin 128–10 is coupled to point 128–10' on the input end of comparator 94 so that when pins 128–8 and 128–10 are jumpered at receptacle 128 by jumper 129 of plug 130, the output of integrator 86 is coupled directly to comparator 94. Also, as pin 128–13 is coupled to point 128–13' of clock 102, and as pin 128–14 is coupled to point 128–14' of clock 102, jumpering of pins 128–13 and 128–14 at receptacle 128 by jumper 131 of plug 130 couples the delay circuit of transistor 110 to the power source of said switch 108.

For the operation of Mode 1, plug 130 of FIG. 3 is coupled to receptacle 128 of FIG. 3. This provides the necessary jumpering of pins 128–8 and 128–10 and pins 128–13 and 128–14 as described above.

For the operation of Mode 2, plug 134 of FIG. 7 is coupled to receptacle 136 of FIG. 3 and plug 138 of FIG. 7 is coupled to receptacle 128 of FIG. 3 and switch 142 of FIG. 7 is manually set in the open position. This inserts the calibrating signals available from the circuitry of FIG. 7 into the circuitry of FIG. 3 permitting calibration of the GO-NO GO operation of tester 34 and locks out any signal from detector 32.

For the operation of Mode 3, plug 140 of FIG. 7 is coupled to receptacle 128 of FIG. 3. This couples the output of integrator 86 at node 90 and point 128–8' to node 166 of comparator 160 by way of pin 140–13, couples the supply voltage of +25 v. at point 128–13' to switch 174 of clock 111 and supplies the control signal at point 128–15' to the circuitry associated with the transistor 154-switch 155 combination by way of pin 140–15. This permits the collection of the data necessary to plot the graph of FIG. 9 of the time-temperature integral in volts vs. weld pull-strength in pounds and permits the determination from this graph of the optimum time-temperature integral value in volts which can then be set into potentiometer 98 of FIG. 3 to establish the desired confidence level of weld quality determination.

Figure 8:
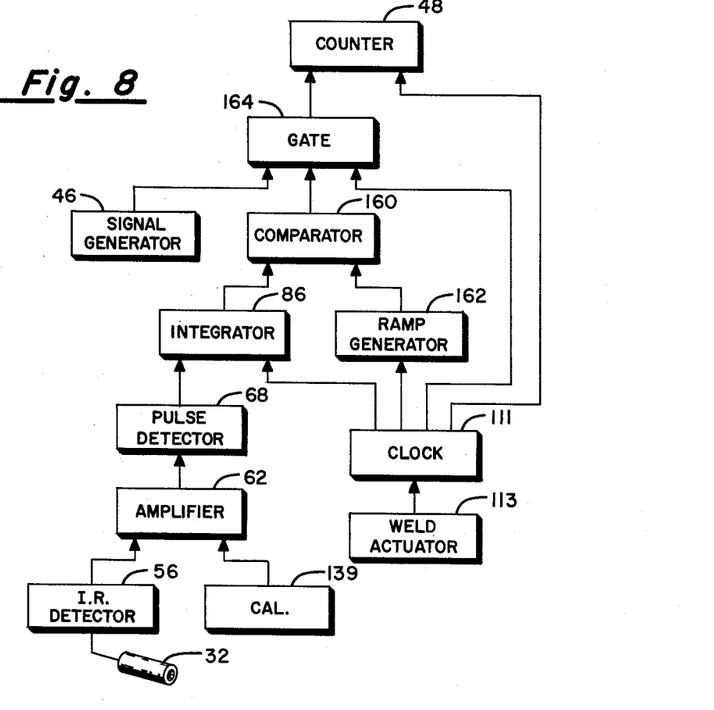
FIG. 8 is a block diagram of the calibrated test data determination of the circuit of FIG. 7.

FIG. 8 is a block diagram of tester 34 when operated in Mode 2 and Mode 3 and includes the hardware of the circuits of FIGS. 3 and 7. For the operation of Mode 2, plug 138 of FIG. 7 is coupled to receptacle 128 of FIG. 3 and plug 134 of FIG. 7 is coupled to receptacle 136 of FIG. 3 and switch 142 of FIG. 7 is manually set in the open position. With plug 134 coupled to receptacle 136, the output of detector 32 is locked out of the circuit of FIG. 3 and pulsing relay 144 provides, in place of such output, an electronically shaped pulse having a magnitude determined by the setting of potentiometer 146 of FIG. 3. With switch 148 of FIG. 3 set to position 148a, the output of lamp 38 should indicate a NO GO by becoming illuminated while with switch 148 set to position 148b, the output of lamp 38 should indicate a GO by not becoming illuminated.

With the above noted Mode 2 preparatory interconnections completed, the calibration pulse generation is as follows. The weld cycle is initiated in the conventional manner by the depressing of foot pedal actuator 14 which actuates pressure switch 114 in weld actuator 113 when the preset electrode pressure is reached. Switch 114 activates switch 116 which in turn couples the necessary supply voltage of +25 v. to point 128–13' of clock 102 of FIG. 3b. This couples, through pin 138–13 of plug 138 of FIG. 7a, the supply voltage to the circuitry associated with transistor 154. The coupling of plug 134 to receptacle 136 couples the supply voltage of +300 v. of amplifier 62 of FIG. 3a through potentiometer 146 to the normally closed contact of switch 144. This permits capacitor 137 of pulse forming network 139 to charge up toward the supply voltage level established by potentiometer 146. When transistor 154 conducts due to the coupling thereto of the supply voltage from weld actuator 113, switch 155 is closed coupling the supply voltage to the solenoid of switch 144 permitting the charge built up on capacitor 137 to discharge into the associated RLC circuit. The discharge of capacitor 137 into the associated RLC circuit produces at node 141 a calibrating pulse whose amplitude is determined by the charging voltage level as established by potentiometer 146 of amplifier 62.

For the operation of Mode 3, plug 140 of FIG. 7 is coupled to receptacle 128 of FIG. 3 and switch 142 of FIG. 7 is manually set in the closed position.

Figure 9:
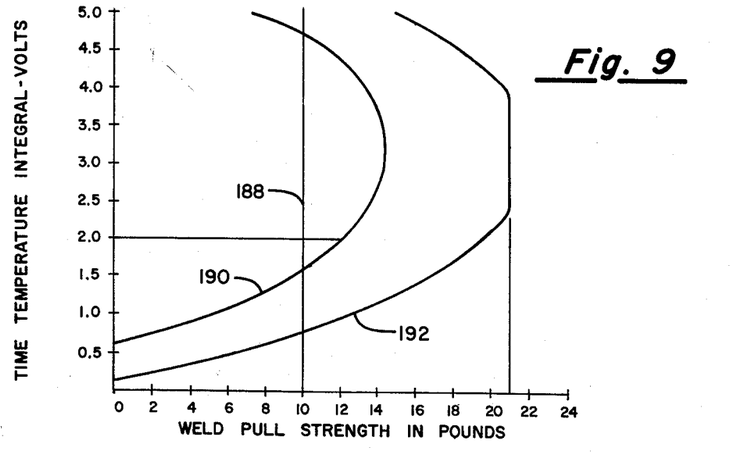
FIG. 9 is a plot of time-temperature integral in volts vs. weld pull-strength in pounds as utilized in a determination of the voltage representative of the optimum quality control acceptance confidence level to utilize with GO-NO GO operation of FIG. 2.

Data necessary to plot a graph of weld pull-strength in pounds vs. time-temperature integral in volts as illustrated in FIG. 9 is obtained by the use of signal generator 46 and counter 48 and includes the use of the three delay stages of transistors 154, 156 and 158, voltage comparator 160, and ramp generator 162 with gate 164 between signal generator 46 and counter 48 being enabled by delay stage 156 and being disabled by comparator 160. The output of integrator 86 at node 90 is coupled by way of plug 140 to input node 166 of operational amplifier 168. The signal coupled to input node 170 of operational amplifier 168 is a ramp voltage from ramp generator 162 including operational amplifier 171 and having an adjustable rate as determined by the setting of potentiometer 172. With the weld cycle initiated as at Mode 1, switch 116 couples the supply voltage of +25 v. (see weld actuator 113 of FIG. 3b) by way of point 128–13' (see clock 102 of FIG. 3b) through pin 140–13 to switch 174 terminal 174a (see clock 111 of FIG. 7a). The coupling of the supply voltage to terminal 174a provides a charging voltage across the RC networks associated with transistors 154, 156 and 158. When the associated RC network capacitors charge to the proper bias voltage level after delays of 10 ms., 50 ms. and 1600 ms. as determined by such capacitors, transistors 154, 156 and 158, respectively, conduct closing switches 155, 176 and 174, respectively. The closing of switch 155 after a 10 ms. delay enables the supply voltage, through switch 142, to close switches 181 and 182. The closing of switch 182 couples a counter reset signal to counter 48 by way of conductor 183 setting the count of counter 48 to zero preparatory to measuring the time-temperature integral of the monitored radiated heat-energy represented by the voltage level at node 90 of integrator 86 which is coupled to node 166 of comparator 160 by way of point 128–8' and pin 140–8. The closing of switch 181 removes the short circuit across amplifier 171 which has been set to a null or zero output at node 170 by the proper bias setting of potentiometer 180. The closing of switch 176 after a 50 ms. delay couples by way of conductor 179 an initiate signal to generator 162 causing transistor 175 to conduct and an enabling signal to gate 164 by reverse biasing diode 185 thus enabling the pulses from signal generator 46 to enter counter 48. The conduction of transistor 175 enables zener diode 177 to establish the proper bias at the input of amplifier 171 through potentiometer 172 which establishes the frequency of ramp generator 162 output at node 170. At this time the voltage level 96 from node 90 (see FIG. 6) is impressed upon node 166 and the ramp signal from ramp generator 162 is impressed upon node 170. Comparator 160 compares these signals and when the potential at node 170 equals that at node 166 amplifier 168 provides a negative signal at node 178 which disables gate 164 by forward biasing the previously reversed biased diode 187 thus blocking the passage of count signals from signal generator 46 into counter 48. The closing of switch 174 after a delay of 1600 ms. removes the supply voltage from transistors 154, 156 and 158 which in turn de-energizes switches 155, 174, 176, 181 and 182 placing calibrator 44 in an essentially inactive state ready for the next monitor cycle.

In the preferred embodiment ramp generator 162 output was set at a rise rate of 10 volts per second and signal generator 48 output was set at a frequency of 1 kilocycle per second causing the output of counter 48, which output is displayed by a decade counter, to be read as hundredths of volts. Maximum counter 48 output was limited to a count of 1600 or a 16 volt level by the turn off action of the delay stage of the transistor 158-switch 174 combination of clock 111. Additionally, the 50 ms. delay from initiation of the weld cycle until initiation of the ramp voltage generation due to the delay stage of the transistor 156-switch 176 combination was determined to be of sufficient duration to permit the integration of the total effective heat-energy radiated from the weld during the weld cycle.

With the operation of Mode 3, the plot of FIG. 9 may be realized. As stated previously, the purpose of Mode 3 operation is to determine a voltage level, or time-temperature integral value, which is representative of an acceptable weld. Thus, with electrode clamping pressure setting means 16 of weld head 10 and with energy setting means 22 of power supply 12 set at various combinations of settings, a number of sample welds are produced and monitored by detector 32. The resulting welds are then destructively tested for weld quality as pull-strength in pounds, with a plot of pull-strength in pounds vs. time-temperature integral in volts resulting in the graph of FIG. 9, the plotted data having maximum limit curves 190 and 192. In work piece 24 of the subject run, the yield strength of work piece 24 produced a maximum of 21 pounds pull-strength as a limiting factor. Optimum weld pull-strength, which may be determined by established quality control methods, was then determined to be 10 pounds and was entered as a limiting line 188 for the selection of an optimum time-temperature integral value. Using the curve 190 and line 188 as limiting criteria, a time-temperature integral lying on line 188 and above the lower portion of curve 190 produced an optimum value of 2.0 volts. For operation of Mode 1, potentiometer 98 of FIG. 1 was set such that an integrator 86 output of less than 2.0 volts resulted in a tester 34 NO GO indication.

It is understood that suitable modifications may be made in the structure as disclosed, provided such modifications come within the spirit and scope of the appended claims. Having now, therefore, fully illustrated and described my invention, what I claim to be new and desire to protect by Letters Patent is:

What is claimed is:

1. A method of determining the quality of a weld produced on a welding device having settable, variable, electrode-clamping pressures and weld input energy comprising the steps of:

(1) performing a series of test welds at various pressures to determine a satisfactory electrode clamping pressure, (2) setting the electrode pressure determined in (1) in the welding equipment,
(3) determining a range of welding equipment weld energy settings,
(4) conducting a sample run of welds at each energy setting of (3) and monitoring the time-temperature integral of each such weld,
(5) destructively testing all the welds to determine the quality of the welds as a function of the weld pull-strength in pounds vs. the time-temperature integral of the weld,
(6) plotting a graph of the results of (5) as weld pull-strength in pounds vs. energy settings,
(7) determining from (6) the optimum energy setting,
(8) plotting a graph of weld pull-strength in pounds vs. time-temperature integral for the optimum energy setting determined in (6),
(9) determining from (8) the minimum time-temperature integral value that would provide the desired confidence level of weld quality,
(10) calibrating the monitor to indicate an unacceptable weld in accordance with (9).

2. A method of determining the quality of a weld produced on a welding device having settable, variable, electrode-clamping pressure and weld input energy comprising the steps of:
(1) performing a series of test welds at various pressures to determine a satisfactory electrode clamping pressure,
(2) setting the electrode pressure determined in (1) in the welding equipment,
(3) determining a range of welding equipment weld energy settings,
(4) conducting a sample run of welds at each energy setting of (3) and monitoring the energy dissipation of each such weld by an infrared detector which monitors the infrared radiated time-temperature integral of the total energy dissipated in the weld workpiece,
(5) destructively testing all the welds to determine the quality of the welds as a function of the weld pull-strength vs. the time-temperature integral of the total energy dissipated in the weld,
(6) plotting a graph of the results of (5) as weld pull-strength vs. the time-temperature integral of the total weld energy dissipation
(7) determining from (6) the minimum weld energy dissipation that would provide the desired confidence level of weld quality,
(8) calibrating the monitor to indicate an unacceptable weld in accordance with (7).

3. A method of determining the quality of a resistance weld comprising the steps of:
(1) determining the weld schedule by conventional methods,
(2) performing a series of welds at various electrode pressures and input energies and monitoring the time-temperature integral of each weld,
(3) destructively testing the welds of (2) to determine the correlation of their pull-strength in pounds with the time-temperature integral of the energy dissipated in the weld,
(4) plotting the results of (3) as pull-strength in pounds vs. the monitored time-temperature integral,
(5) entering an acceptable minimum pull-strength value as a straight line limit on the graph of (4),
(6) determining the acceptable time-temperature integral value range from (5),
(7) calibrating the monitor to indicate an unacceptable weld in accordance with (6).

4. A method of determining the quality of a weld comprising the steps of:
(1) determining the weld schedule by conventional methods,
(2) performing a series of welds at various electrode pressures and input energies and monitoring the energy dissipation of each weld by an infrared detector whose output is a voltage, the magnitude of which is a function of the total energy dissipated in the weld,
(3) destructively testing the welds of (2) to determine the correlation of their pull-strength in pounds with the time-temperature integral of the total energy dissipated in the weld,
(4) plotting the results of (3) as pull-strength vs. total weld energy dissipation,
(5) entering an acceptable minimum pull-strength value as a straight line limit on the graph of (4),
(6) determining the acceptable weld energy dissipation range from (5),
(7) calibrating the detector to indicate an unacceptable weld in accordance with (6).

5. A method of determining the quality of a weld comprising the steps of:
(1) performing a series of welds at various weld schedules and monitoring the time-temperature integral of the total heat energy dissipated in each weld,
(2) destructively testing the welds of (1) to determine the correlation of their pull-strength in pounds with the time-temperature integral of the total heat energy dissipated in the weld,
(3) plotting the results of (2) as pull-strength in pounds vs. the monitored time-temperature integral,
(4) entering an acceptable minimum pull-strength value as a straight line limit on the graph of (3),
(5) determining the acceptable time-temperature integral value range from (4),
(6) calibrating the monitor to indicate an unacceptable weld in accordance with (5).

6. A method of determining the quality of a weld comprising the steps of:
(1) performing a series of welds at various weld schedules, and monitoring, by an infrared detector the time-temperature integral of each weld as a function of the total heat energy dissipated in each weld,
(2) destructively testing the welds of (1) to determine the correlation of their pull-strength with the time-temperature integral of the total heat energy dissipated in the weld,
(3) plotting the results of (2) as pull-strength vs. the detected time-temperature integral,
(4) entering an acceptable minimum pull-strength value as a straight line limit on the graph of (3),
(5) determining an acceptable time-temperature integral limit from (4),
(6) calibrating the detector to indicate an unacceptable weld in accordance with (5).

7. A method of determining the quality of a weld comprising the steps of:
(1) performing a series of welds at various weld schedules, and monitoring the radiated time-temperature integral of the energy dissipation of each weld by an infrared detector,
(2) destructively testing the welds of (1) to determine the correlation of their pull-strength with the time-temperature integral of the energy dissipated in the weld,
(3) plotting the results of (2) as pull-strength vs. the monitored energy dissipation,
(4) plotting an acceptable minimum pull-strength from the data of (2) as a straight line limit on the graph of (3),
(5) determining an acceptable minimum energy dissipation from the limits of (4),
(6) calibrating the detector to indicate an unacceptable weld in accordance with (5).

8. A testing device for determining the quality of a weld comprising:
(1) sensing means for sensing the radiant energy emitted by the weld and producing a related electrical signal, (2) integrating means responsively coupled to said sensing means for integrating the related electrical signal over the weld duration,
(3) electronic signal comparing means responsively coupled to said integrating means for comparing the magnitude of the integrated related electrical signal to a previously determined electrical signal magnitude,
(4) electronic means respectively coupled to said comparing means for providing an indication of the result of the comparison of (3).

9. A testing device for determining the quality of a weld comprising:
(1) infrared detector means for sensing the radiant energy emitted by the weld and producing a pulse type outlet voltage related to the intensity of the total emitted radiant energy,
(2) integrator means responsively coupled to said detector means for integrating the output voltage pulse of the detector means,
(3) electronic comparator means responsively coupled to said integrator means for comparing the magnitude of the integrated detector output voltage pulse to a predetermined magnitude,
(4) clock means responsively coupled to said integrator means and said comparator means for coupling the integrator means to the comparator means,
(5) electric indicator means responsively coupled to said comparator means for providing an indication of the result of the comparison of (3).

10. A testing device for determining the quality of a weld comprising:
(1) infrared detector means for sensing the radiant energy emitted by the weld and for producing a related electrical signal,
(2) electronic integrator means responsively coupled to said detector means for integrating said related electrical signal,
(3) electronic comparator means responsively coupled to said integrator means for comparing the magnitude of said integrated related electrical signal to a previously determined magnitude,
(4) electric indicator means responsively coupled to said comparator means for providing an indication of the result of the comparison of (3).

11. A method of determining the quality of a weld comprising the steps of:
(1) destructively testing a plurality of welds made at a plurality of time-temperature integrals of the total heat energy dissipated in the weld thereby determining the correlation between a weld pull-strength and the total heat energy dissipated in the weld and causing to establish an acceptable level of weld pull-strength,
(2) plotting a graph of weld pull-strength vs. the time-temperature integral of the radiation detectable heat energy dissipated in the weld thereby causing to determine an acceptable level of weld heat energy dissipation,
(3) monitoring the weld quality by detecting the total radiated heat energy dissipated in the weld;
(4) electronically comparing the monitored heat energy dissipation of (3) to the acceptable level of (2).

12. A method of determining the quality of a weld comprising the steps of:
(1) destructively testing a plurality of welds made at a plurality of time-temperature integrals of the heat energy dissipated in the weld thereby determining the correlation between a weld pull-strength and the heat energy dissipated in the weld and causing to establish an acceptable level of weld pull-strength;
(2) plotting a graph of weld pull-strength vs. the time-temperature integral of the heat energy dissipated in the weld thereby causing to determine a voltage level representative of an acceptable level of weld heat energy dissipation,
(3) monitoring the weld quality by detecting the heat energy dissipated in the weld and generating a voltage level representative of the monitored weld heat energy dissipation,
(4) electronically comparing the monitored voltage level of (3) to the acceptable voltage level of (2).

References Cited by the Examiner

UNITED STATES PATENTS

| 2,233,617 | 3/41 | Lamb | 219—110 |
| 2,370,009 | 2/45 | Clark et al. | 219—110 |
| 2,814,201 | 11/57 | Cotton | 73—339 |
| 2,817,747 | 12/57 | Devonshire et al. | 219—110 |

OTHER REFERENCES

Industrial High-Speed Infrared Pyrometer, by W. S. Gorrill, Electronics, March 1949, pages 112–114.

RICHARD C. QUEISSER, *Primary Examiner.*

JOSEPH P. STRIZAK, *Examiner.*

UNITED STATES PATENT OFFICE
CERTIFICATE OF CORRECTION

Patent No. 3,191,441　　　　　　　　　　　　　　　　June 29, 1965

Robert A. Erickson

It is hereby certified that error appears in the above numbered patent requiring correction and that the said Letters Patent should read as corrected below.

Column 11, line 16, for "outlet" read -- output --.

Signed and sealed this 17th day of May 1966.

(SEAL)
Attest:

ERNEST W. SWIDER
Attesting Officer

EDWARD J. BRENNER
Commissioner of Patents